United States Patent
Needelman et al.

(10) Patent No.: US 7,228,231 B2
(45) Date of Patent: Jun. 5, 2007

(54) MULTIPLE STAYOUT ZONES FOR GROUND-BASED BRIGHT OBJECT EXCLUSION

(75) Inventors: David D. Needelman, Torrance, CA (US); Richard A. Fowell, Rolling Hills Estates, CA (US); Peter C. Lai, Alhambra, CA (US); Yeong-Wei A. Wu, Rancho Palos Verdes, CA (US); Rongsheng Li, Hacienda Heights, CA (US)

(73) Assignee: The Boeing Company, Chicago, IL (US)

( * ) Notice: Subject to any disclaimer, the term of this patent is extended or adjusted under 35 U.S.C. 154(b) by 295 days.

(21) Appl. No.: 10/709,348

(22) Filed: Apr. 29, 2004

(65) Prior Publication Data

US 2005/0246073 A1 Nov. 3, 2005

(51) Int. Cl.
G01C 21/00 (2006.01)
B64G 1/10 (2006.01)

(52) U.S. Cl. ............. 701/222; 701/4; 701/226; 244/158.4

(58) Field of Classification Search ............ 701/3, 701/4, 200, 222, 224, 226; 244/158.1, 158.4, 244/164, 171
See application file for complete search history.

(56) References Cited

U.S. PATENT DOCUMENTS

| 5,412,574 | A  | * | 5/1995  | Bender et al.    | 701/222 |
|-----------|----|---|---------|------------------|---------|
| 6,289,268 | B1 | * | 9/2001  | Didinsky et al.  | 701/13  |
| 6,470,270 | B1 | * | 10/2002 | Needelman et al. | 701/222 |
| 6,478,260 | B1 |   | 11/2002 | Rice et al.      |         |
| 6,512,979 | B1 | * | 1/2003  | Needelman et al. | 701/222 |
| 6,691,033 | B1 | * | 2/2004  | Li et al.        | 701/222 |
| 7,062,363 | B1 | * | 6/2006  | Needelman et al. | 701/13  |

OTHER PUBLICATIONS

Kudva, P. and Throckmorton, A. "Preliminary Star Catalog Development for the Earth Observation Systems AMI (EOS-AMI) Mission", AIAA Journal of Guidance, Control and Dynamics, vol. 19, No. 6, pp. 1332-1336, 1996.
Wertz, J. (Editor), "Spacecraft Attitude Determination and Control", Kluwer Academic Publishers, Norwell, MA 1991.

* cited by examiner

*Primary Examiner*—Y. Beaulieu
(74) *Attorney, Agent, or Firm*—Ostrager Chong Flaherty & Broitman P.C.

(57) ABSTRACT

A vehicle (12) including a control system (18) is used for controlling vehicle attitude or angular velocity (38). The processor (24) is coupled to a star sensor or tracker (22) and a memory (30) that may include a star catalog (32), and an exclusion list (36). The exclusion list (36), a list of stars to be temporarily excluded from consideration when determining attitude or angular velocity or relative alignment of star sensors or trackers, is calculated on board. Such a calculation prevents the necessity for a costly, periodic, ground calculation and upload of such data. By manipulating the star catalog, or sub-catalogs derived from said catalog, based upon the exclusion list (36), measurements of such excluded stars are prevented from corrupting the attitude or angular velocity or alignment estimates formulated on board. The system uses multiple stayout zones for excluding stars from the exclusion list. A central exclusion zone excludes all stars while a second or more exclusion zones allow some stars to be used in the attitude determination

25 Claims, 4 Drawing Sheets

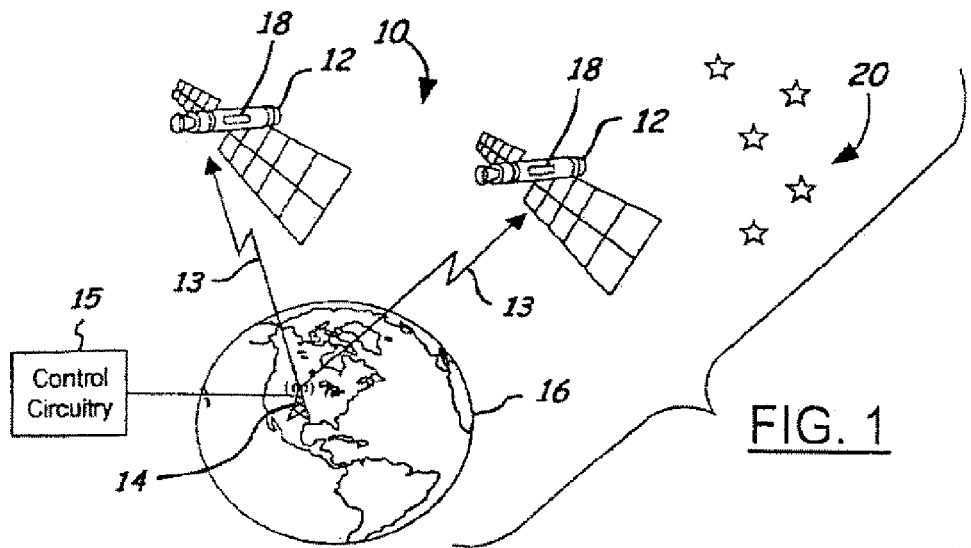
FIG. 1
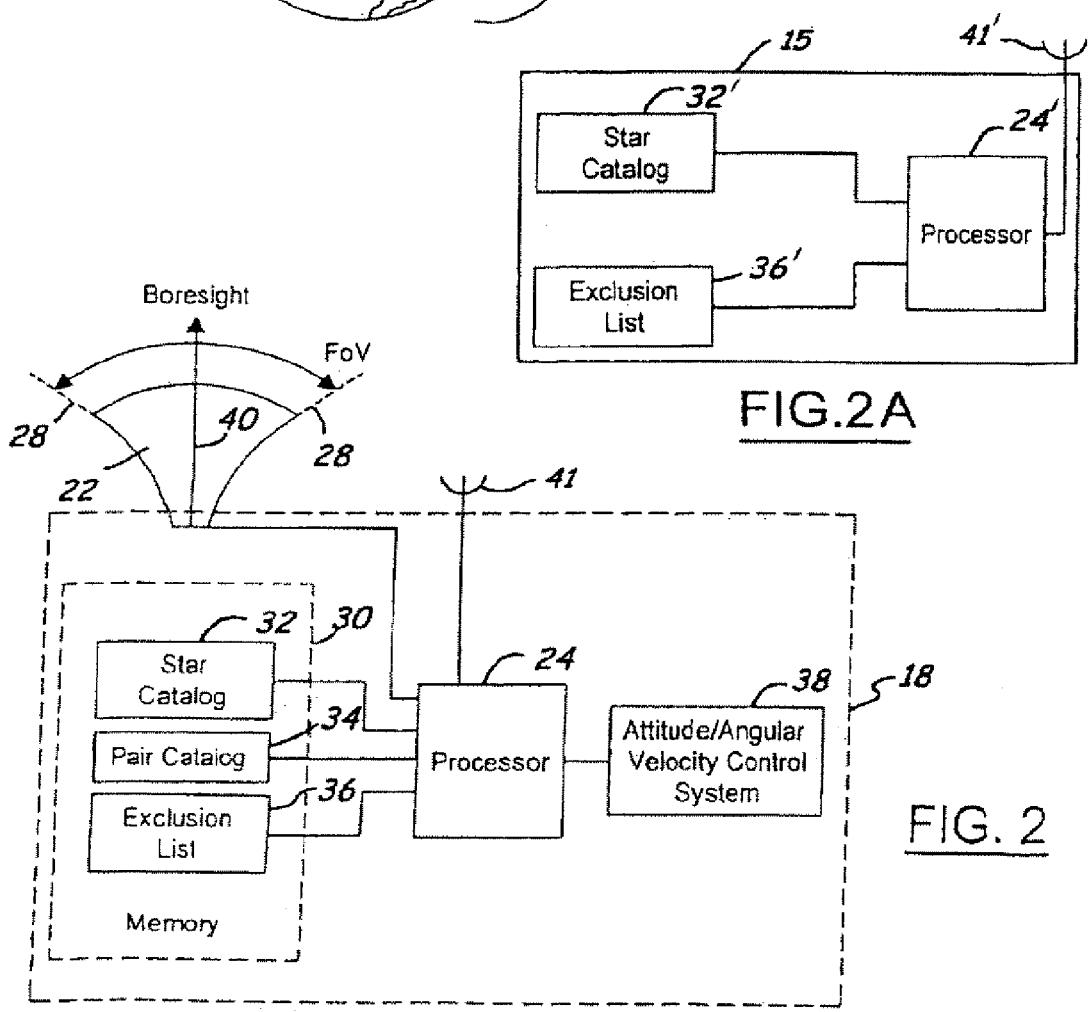
FIG. 2A
FIG. 2

MULTIPLE STAYOUT ZONES FOR GROUND-BASED BRIGHT OBJECT EXCLUSION

FEDERAL RESEARCH STATEMENT

This invention was made with Government support. The Government has certain rights in this invention.

BACKGROUND OF INVENTION

The present invention relates generally to attitude or angular velocity or sensor alignment estimate adjustment for a vehicle, and more particularly, to algorithms involving attitude or angular velocity or sensor alignment determination, using star position measurements and using multiple exclusion zones.

Satellites and other vehicles are in widespread use for various purposes including scientific research and communications. Many scientific and communications missions, however, cannot be accurately fulfilled without consistently monitoring and controlling the 3-axis attitude and angular velocity of the vehicle. In many applications, the vehicle must be oriented to transmit signals in particular directions or to receive signals from specifically located sources. Furthermore, in such a situation, the vehicle angular velocity must be such so as to maintain the desired orientation, over time. Without accurate control over vehicle 3-axis attitude and angular velocity, the transmission or reception of such signals is hindered and at times impossible.

Such control requires systems for 3-axis attitude and angular velocity determination, which generally include one or more star trackers and a 3-axis gyroscope. During normal operation, star trackers or star sensors provide attitude-related information and the 3-axis gyroscope is needed to provide angular velocity information. As there are inherent, and time-varying, errors from star trackers, star sensors, and gyros, it is often necessary to constantly estimate such errors, in order to compensate for them. One common method of doing so is to correlate star tracker or sensor position measurements of stars with known positions of the same stars, as listed in a star catalog, or database. Discrepancies between the measured and predicted positions allow direct estimation of tracker error, and indirect estimation of gyro error. Knowing such errors allows estimation of attitude or angular velocity, or refinement of existing estimates. Furthermore, if there are multiple star trackers or star sensors on-board, such correlations allow determination of the alignment of such trackers or sensors, with respect to each other; such determination yields greater accuracy in future attitude and angular velocity estimates.

Stellar Inertial Attitude Determination (SIAD) algorithms employ a carefully designed star catalog or database for selection and identification of stars tracked by star trackers or star sensors. The current known art in star selection for star trackers mainly concentrates on generating star catalogs with certain properties. Typically, one method of locating entries in a star catalog that correspond to stars in a tracker field of view (FOV) uses a standard binary search that is sorted by declination only. This method is not very efficient because it involves searching through hundreds of entries to find the stars that are located within the FOV.

Various other methods involve generation of multiple overlapping sub-catalogs that contain stars for a specific FOV in the sky. At any point in time, the stars within a star tracker's FOV will reside in one or more of these sub-catalogs. Each star catalog entry that is represented in a FOV sub-catalog has been determined, using on-board processing, to be in the tracker FOV.

In a SIAD algorithm, the entries corresponding to stars intruded by bright objects such as planets, asteroids, or comets, need to be excluded from the star catalog or sub-catalog, i.e., excluded from consideration by the algorithm. This is so that bright objects are not mistaken for stars, or the light from the objects does not corrupt the measurements made by the star sensor. Traditional object-based catalog entry exclusion is performed on the ground. These stars intruded by planets or other bright objects are excluded from a revised copy of the on-board star catalog. The revised star catalog is then uploaded to the spacecraft control processor (SCP). The uploading is time-consuming and may easily be interrupted. This may cause delays in the proper attitude determination or errors in the on-board version of the catalog.

Traditionally, there is only one stayout zone for each object in the exclusion algorithm. All the stars inside the stayout zone are excluded from the star catalog so that the bright planet/object will not be mistaken as a star during attitude determination. The exclusion zones may be excessively large and over-inclusive. The number of stars excluded may be such that attitude determination performance may be reduced.

It would therefore be desirable to provide a system that decreases the number of excluded stars to improve the performance of the attitude determination system.

SUMMARY OF INVENTION

The present invention improves the performance of the attitude determination system by allowing less stars to be excluded by the spacecraft in the exclusion system.

In one aspect of the invention a method of operating a star tracker includes determining multiple stayout zones for an object, selecting a first stayout zone from the multiple stayout zones, determining a star in the first stayout zone, and determining a vehicle inertial attitude or angular velocity based on star measurements of sensed or tracked stars, excluding the star within the first stayout zone.

In a further aspect of the invention, a vehicle includes an attitude or angular velocity control system, a star tracker having a field of view, and a star catalog memory having a star catalog stored therein. The star catalog has a plurality of entries, each entry having an associated flag therewith. The spacecraft further includes an exclusion list memory. A processor is coupled to the attitude or angular velocity control system, the star tracker, the star catalog memory, and the exclusion list memory. The processor determines multiple stayout zones for an object and selects a stayout zone from the multiple stayout zones. The processor further determines a plurality of objects in the stayout zone excluding at least one of the objects from the field of view within the stayout zone to form a revised a database, star catalog or star sub-catalog. The processor determines a vehicle inertial attitude, angular velocity, relative star sensor or tracker misalignment estimate in response to the revised database, star catalog, or star sub-catalog and controls the attitude control system or angular velocity system in response to the revised database, star catalog, or star sub-catalog.

One advantage of the invention is that by providing multiple stayout zones, the amount of stars excluded may be reduced to improve the attitude determination performance.

Other aspects and advantages of the present invention will become apparent upon the following detailed description and appended claims, and upon reference to the accompanying drawings.

BRIEF DESCRIPTION OF DRAWINGS

FIG. 1 is a perspective view of a set of vehicles (depicted as a satellite system, in accordance with the preferred embodiment of the present invention) for determining stars in a star tracker field of view;

FIG. 2 is a block diagram of an apparatus for determining stars in a star tracker field of view in accordance with the preferred embodiment of the present invention; and FIG. 2A is a block diagram of a control circuit for the ground station.

DETAILED DESCRIPTION

Figure 3:
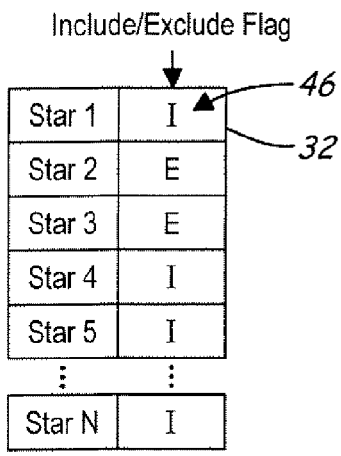
FIG. 3 is a diagrammatic view of a star catalog.

In the following figures the same reference numerals will be used to identify the same components.

The present invention is described with respect to a star catalog, or sub-catalog, entry exclusion system for a vehicle. It should be noted that various types of vehicles may benefit from the exclusion system. It should also be noted that the exclusion system is not limited to exclusions due to the effects of planets. Rather, various objects such as planets, asteroids, comets, other extraterrestrial objects, or other vehicles, may be the cause of exclusion. Also, gyros or other information may be used in addition to star catalog/stay out zone calculations.

Referring to FIG. 1, a perspective view of a system 10 for determining stars in a star tracker field of view (FOV) in accordance with one embodiment of the present invention is illustrated. The system 10 is comprised of one or more vehicles 12. The system may also be in communication or coupled to a ground station 14 through signals 13. The ground station 14 may include control circuitry 15 used to determined the stay out zones. The ground station 14 may include various types of ground based stations including but not limited to a network operation center, a control center, or the like. Each vehicle 12 includes an apparatus 18 for determining inertial attitude based upon a plurality of stars 20. The vehicle 12 may be one of various types of vehicles, including satellites and other spacecraft.

The apparatus 18 is responsible for locating stars 20 within or near a star tracker field of view in order to control the attitude or angular velocity of vehicle 12. Many scientific and communications missions cannot be accurately fulfilled without consistently monitoring and controlling the vehicle 3-axis attitude or angular velocity. In many applications the vehicle must be positioned to transmit signals in particular directions or to receive signals from specifically located sources. Without accurate control over vehicle 3-axis attitude and angular velocity, the transmission or reception of such signals is hindered and at times impossible.

Referring to FIG. 2, a block diagram of apparatus 18 for determining stars 20 within or near a star tracker field of view 28 in accordance with one embodiment of the present invention is illustrated. Apparatus 18 includes a star tracker or star sensor 22 and a processor 24. Apparatus 18 also includes a memory 30 that includes a star catalog 32, and an exclusion list 36. The processor 24 may also be coupled to an attitude or angular velocity control system 38.

Star tracker 22 is mounted to the vehicle 12 and is coupled to processor 24 in a conventional manner. Star tracker 22 includes a field of view (FOV) 28 and a boresight 40 in the FOV 28. Star tracker 22 is used to sense a plurality of positions, relative to star tracker 22, of a plurality of stars 20. Star tracker 22 then generates a plurality of signals corresponding to the plurality of star positions in the FOV 28. It should be noted that more than one star tracker 22 may be included on a vehicle. The present invention allows determination of multiple star trackers with respect to the others when multiple star trackers are used.

Processor 24 may be an individual processor or may be comprised of a plurality of processors. For example, star tracker 22 may include its own processor. Likewise, attitude or angular velocity control system 38 may also comprise its own processor such as a spacecraft control processor (SCP). For simplification purposes the processor is illustrated as a single component. Each processor may be microprocessor-based. Processor 24 resides in vehicle 12. Processor 24 is coupled to star tracker 22 and receives the plurality of signals corresponding to the plurality of star positions in the FOV 28. Processor 24 provides control logic operative to select at least one of the plurality of signals corresponding to the positions of one or more stars. Processor 24 uses star catalog 32 to determine which stars 20 to select or determine the stars' positions with respect to the Earth-Centered Inertial (ECI) frame.

Memory 30 is illustrated as a plurality of separate elements. Those skilled in the art will recognize that the memory may comprise a single memory system. It should also be noted that if a microprocessor is used for processor 24 that the microprocessor may include memory therein. The memory may include various types of memory including but not limited to random access memory (RAM).

The attitude or angular velocity control system 38 may comprise a plurality of thrusters and momentum wheels as will be evident to those skilled in the art. The attitude or angular velocity control system 38 controls the various momentum wheels or thrusters to orient the vehicle in its desired direction.

An antenna 41' may be coupled to processor for sending and receiving various control signals and/or calculations to ground station 14.

Referring now to FIG. 2A, the control circuitry 15' may also perform exclusion as described below. The control circuitry 15' may include similar elements to that of the vehicle. Each similar element has been primed. That is, a star catalog 32' and exclusion list 36' are coupled to a processor 24'. An antenna 41' may be used to communicate various signals to vehicle 12.

Referring now to FIG. 3, a simplified database, star catalog or sub-catalog 32 is illustrated. Each entry in catalog or sub-catalog 32 may include associated star information and may also include an include/exclude flag 46. The include/exclude flag may, for example, be implemented as a binary zero or one. For illustration purposes an "I" for include and an "E" for exclude have been used. The processor 24, as will be further described below, may be programmed to change the include/exclude flag 46 to a desired state. That is, processor 24 may change the flag 46 to include from exclude or to exclude from include (flagging). Star catalog 32 may also consist of a plurality of information including but not limited to star right ascension and declination angles in a given ECI frame, star instrument magnitude, and other star properties. Star catalog 32 may contain data that is stored using primary and multiple secondary arrays. It should also be noted that various numbers of stars may be included in the catalog.

Figure 4:
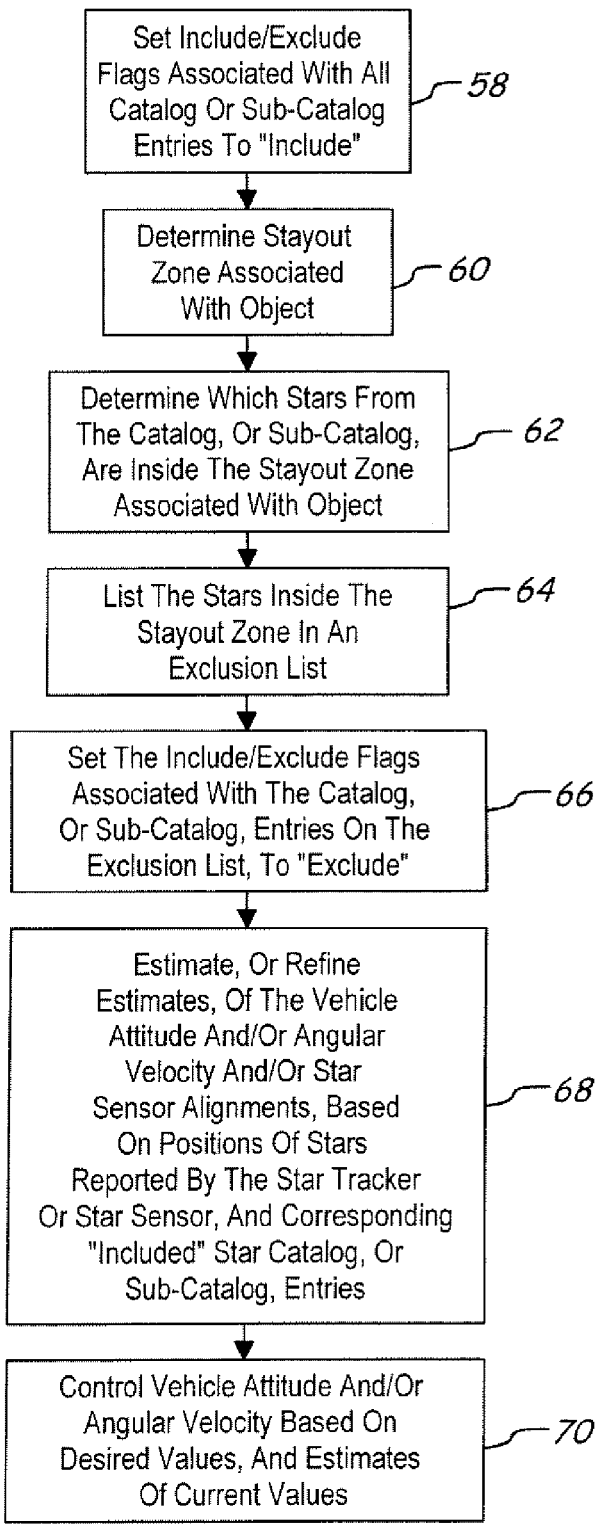
FIG. 4 is a flow chart of a first embodiment of a method for determining stars in a star tracker field of view in accordance with the preferred embodiment of the present invention.

Referring to FIG. 4, a flow chart of a method of a first embodiment of a method according to the present invention is illustrated. It should be noted that the method may take place on board the vehicle or on the ground. Various steps may be performed in either location and communicated to the other location. In step 58, the include/exclude flags associated with each star catalog or sub-catalog entry are set to include. In step 60 a stayout zone, associated with a bright object, is determined. The stayout zone may, for example, be a regular shape such as a rectangular or square field of view. The stayout zone may also be variable in size and may also be round or oblong. The properties of the stayout zone may be a function of the object position and magnitude; they may also depend on various other parameters, such as magnitude and position of the stars within the zone. In step 62 the determination of which stars are inside the stayout zone of the bright object or planet is made. In step 64 the stars to be excluded are listed in the exclusion list. In step 66 the stars in the exclusion list are flagged as excluded by switching the include/exclude flag of the corresponding star catalog or sub-catalog entries to exclude.

In step 68, based on star sensor measurements of the positions of stars listed in the star catalog or sub-catalog, and flagged as included, the spacecraft inertial attitude estimate or angular velocity estimate is determined or refined. In step 70, the attitude is controlled to orient the spacecraft as desired, or the angular velocity is controlled to maintain the desired attitude over time. Other considerations such as vehicle gyros such as 3-D gyros may also be taken into consideration.

It should be noted that the steps described above may all be performed on the spacecraft. This prevents problems due to timing and errors due to the transmission of the information from a ground station.

Figure 5:
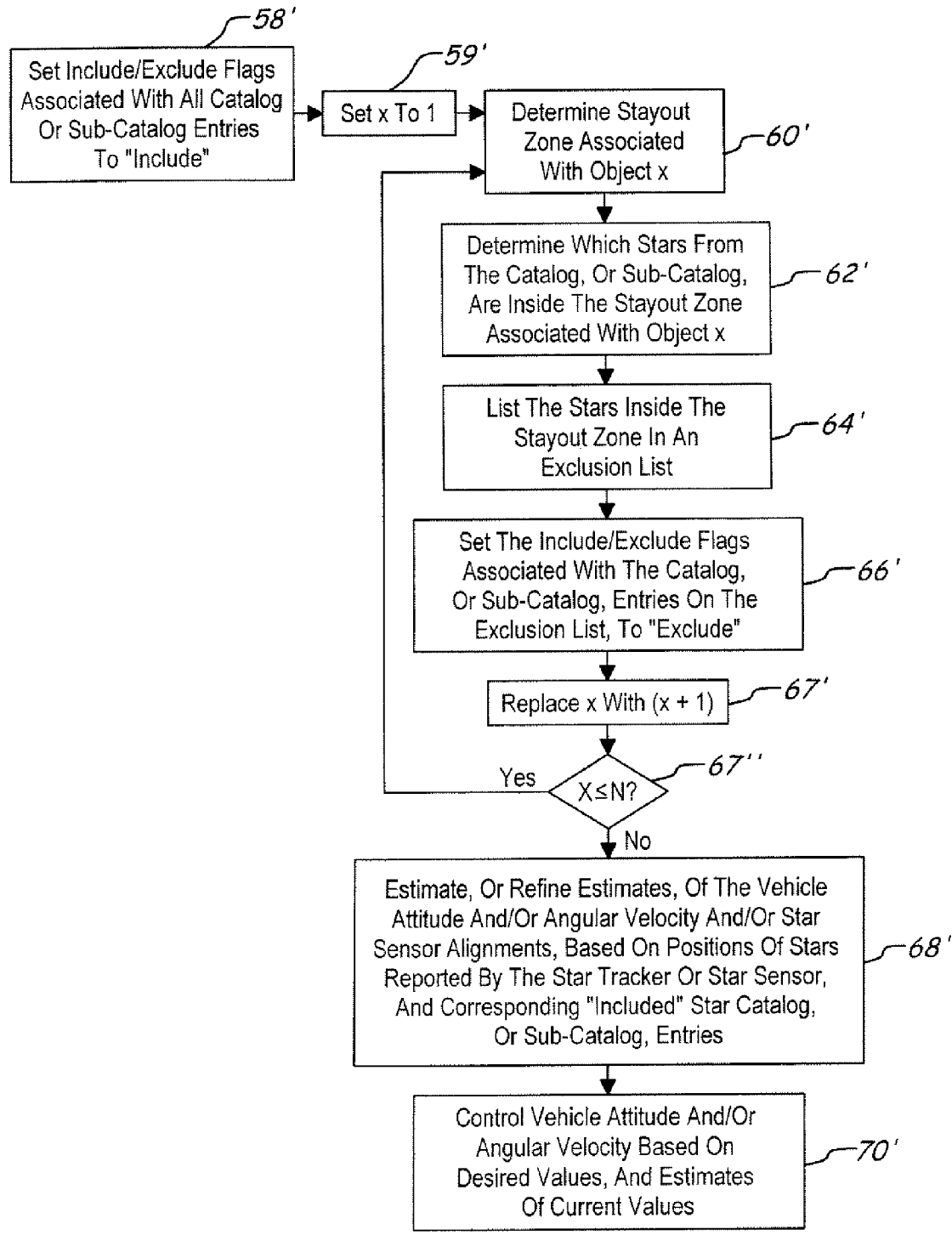
FIG. 5 is a flow chart of a second embodiment of a method for determining stars in a star tracker field of view in accordance with the preferred embodiment of the present invention.

Referring now to FIG. 5, the same process described above with respect to FIG. 4 may be used for multiple planets or objects. N is defined as the number of objects.

The configuration is nearly identical in that step 58' initializes all star catalog or sub-catalog include/exclude flags to include, step 60' determines a stayout zone for bright object x, where x was set to 1 in step 59', step 62' calculates the stars inside the stayout zone of bright planet/object x, step 64' lists the stars to be excluded in an exclusion list.

Step 66' excludes the stars in the exclusion list from consideration in attitude or angular velocity estimate formulation by switching include/exclude flags of the corresponding star catalog entries to exclude.

In step 67', x is replaced with (x+1). In step 67", should the new value of x be less than or equal to N, the procedure returns to step 60', to determine exclusions due to object x. Should the value of x be greater than N, in step 68', the spacecraft attitude or angular velocity or relative star sensor or tracker alignments may be determined after the star catalog exclusions due to the last planet/object N are determined in step 66'. Likewise, in step 70', the attitude or angular velocity may be controlled only after the attitude or angular velocity is determined.

It should be noted that the present invention may be used autonomously to perform realtime exclusion. Also, periodic maintenance for all the planets/objects may be performed or individually performed. The excluded star list may also be stored as part of a whole list or an individual list corresponding to the planet/object.

Figure 6A:
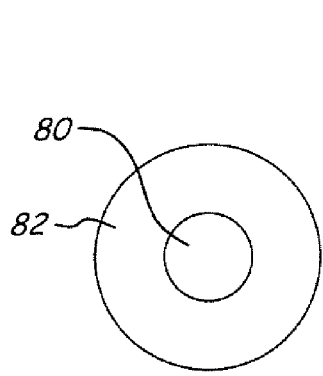
FIG. 6A is one example of multiple stayout zones including two circular stayout zones.

Referring now to FIG. 6A, multiple stayout zones may be used in the exclusion determination. The stayout zones may be multiple shapes and multiple sizes. Also, multiple numbers of stayout zones such as two, three, four, etc. may be used. By using multiple stayout zones, the number of stars used for attitude determination may be increased.

As shown in FIG. 6A, a first stayout zone 80 circular in shape is illustrated. A second stayout zone 82 is concentric with the first stayout zone. As will be further described below, the first stayout zone 80 may have all stars excluded from therein. In stayout zone 82, only stars that are dimmer than a first threshold may be excluded.

Figure 6B:
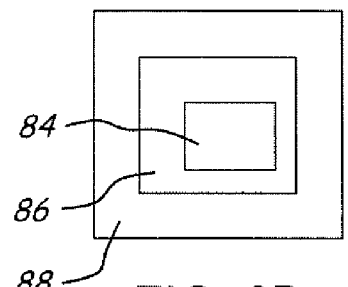
FIG. 6B is an example of three stayout zones as the multiple stayout zones which are rectangular.

Referring now to FIG. 6B, three stayout zones are provided. The center rectangular stayout zone 84, a second stayout zone 86 that forms an annular band around the first stayout zone, and a third rectangular stayout zone 88 is also illustrated. In the first stayout zone 84, all the stars may be excluded. In stayout zone 86, only stars dimmer than a first threshold may be excluded from this annular band. In stayout zone 88 which forms an annular band around stayout zone 86, only stars that are dimmer than a second threshold may be excluded. As illustrated in FIG. 6B, each of the stayout zones may be rectangular or square in shape.

Figure 6C:
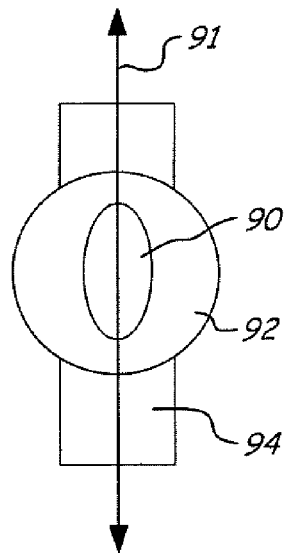
FIG. 6C is a third embodiment of a multiple stayout system including three different types of stayout zones including circular, elongated and rectangular.

Referring now to FIG. 6C, three differently shaped stayout zones may be provided. The first stayout zone 90 corresponds to an area where all stars are excluded there from. Stayout zone 90 is elliptical or oval in shape. The elongated shape corresponds to a column within a CCD of the star tracker. A second stayout zone 92 having first stayout zone 90 therein excludes stars that are dimmer than a first threshold. A third stayout zone 94 is elongated in the direction of axis 91. The stayout zone 94 is rectangular in shape. The rectangle is narrower, in this example, than the width of stayout zone 92.

One reason for providing an elongated stayout zone is the deleterious effects of bright objects on the sensors in the star trackers. An effect known as CCD array blooming forms a highly asymmetric image that typically occurs along the readout column direction of the sensor with a rectangular field of view. Prior knowledge of the intended pointing direction of the star tracker may allow a suitably restrictive yet overly conservative stayout zone in the star catalog. Depending on the application, this region need not guarantee non-interference, but simply reduce the probability of interference. Other uses of non-circular stayout zone shapes is for inherently non-circular objects such as comet tails.

Further, a spacecraft typically operates in three different scenarios. That is, the satellite may have no attitude knowledge, rough attitude knowledge, or priority attitude knowledge. The present invention is capable of worse scenario no attitude knowledge. The circular stayout zones are typically useful for any application in any of the above mentioned scenarios, particularly no attitude knowledge. Once some attitude knowledge is obtained, the stayout zones may be reduced in one or both horizontal and vertical directions to increase the number of stars available for attitude determination. Rectangular stayout zones or a combination circular and rectangular zones may be performed on orbit. However, these zones are particularly useful for exclusion performed on the ground, when rough attitude information is available. The stars inside the part or whole rectangular field of view of the star sensor can be excluded based on the spacecraft nominal steering profile in order to avoid the CCD array blooming problem. The star catalog may then be uploaded from the ground to the spacecraft.

Figure 7:
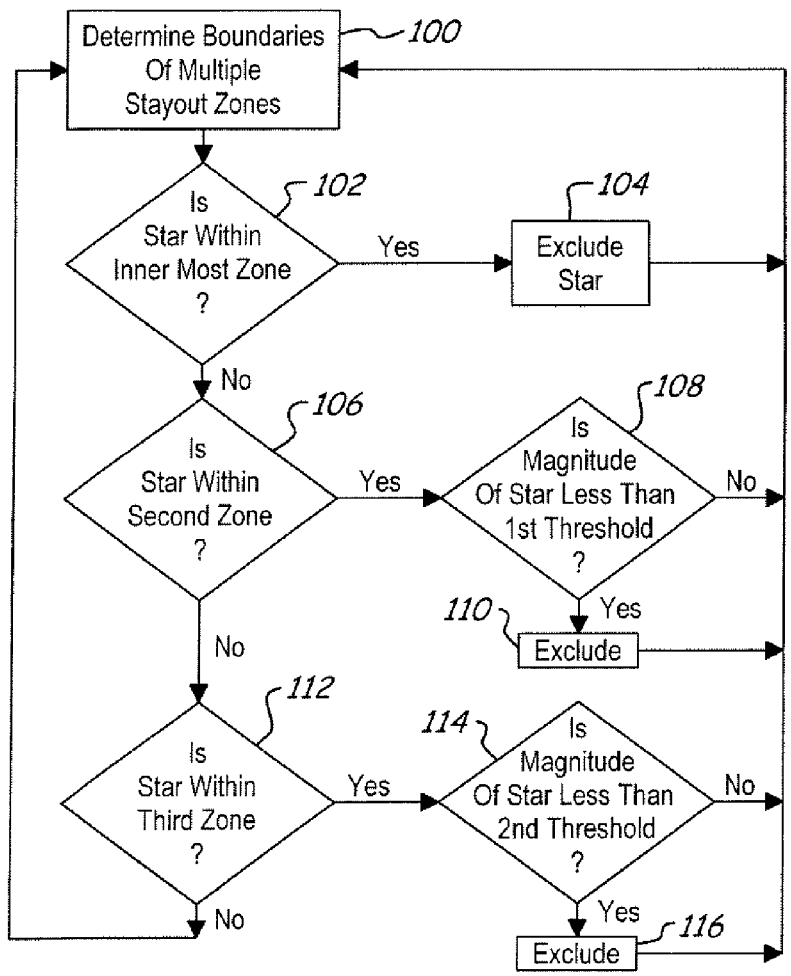
FIG. 7 is a flow chart illustrating a method of operating a system using multiple stayout zones.

Referring now to FIG. 7, a method of operating a system using multiple stayout zones is illustrated. Again, the calculations may be performed on the ground or on the vehicle. In step 100 the boundaries of multiple stayout zones for a particular object is determined. As mentioned above, the multiple stayout zones may be of various shapes, sizes and numbers. The present example is set forth with three stayout zones. However, two, three, four, etc. may be provided. In step 102 if the star is within the innermost stayout zone, step 104 excludes the star from the stayout zone. Step 100 may then be executed for a different bright object.

Referring back to step 102, if the star is not within the innermost zone, step 106 determines whether the star is within a second zone outside of the first zone. If the star is outside of the first zone and within the second zone, step 108 is executed. If the magnitude of the star is less than a first threshold in step 108 the star is excluded in step 110. In step 108, if the star is not less than a first threshold or after step 110, step 100 is excluded for a different star for a different object.

Referring back to step 106, if the star is not within a second threshold, step 112 determines whether the star is within a third zone outside of the second zone. If the star is within the third zone, step 114 is executed. In step 114, if the magnitude of the star is less than a second threshold, step 116 excludes the star from the star catalog. In step 114 if the magnitude of the star is not less than the second threshold and after step 116, step 100 is executed for a different star for a different object.

Referring back to step 112, if the star is not within the third zone, step 100 is again executed.

The above method is suitable for objects of magnitude of +1 or brighter. Typically, objects with a stellar magnitude of +1 or brighter are ignored with a singular circular stayout zone of 0.5 degrees. Objects that may reach a magnitude of +1 or brighter may include Mars, Jupiter, Venus, Saturn, Uranus, and Neptune. Further, the small central stayout zone provides complete exclusion while a larger region includes stars that were excluded in prior systems. Thus, more stars are available for attitude determination.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

The invention claimed is:

1. A method of operating a star tracker comprising:
   in a ground station, determining multiple stayout zones including both circular and non-circular stayout zones and calculating at least one circular stayout zone and one non-circular stayout zone for an object;
   in said ground station, selecting a first stayout zone from said multiple stayout zones;
   determining a star in said first stayout zone; and
   determining a vehicle inertial attitude or angular velocity, based on star measurements of sensed or tracked stars, excluding said star within said first stayout zone,
   wherein excluding the star is dependent on the brightness of the star and of the object, said brightness having a first and second magnitude, said second magnitude being different than the first magnitude.

2. A method as recited in claim 1 wherein excluding the star is performed for a fixed period of time.

3. A method as recited in claim 1 wherein excluding the star is performed for a non-fixed period of time.

4. A method as recited in claim 1 further comprising controlling vehicle attitude or angular velocity, in response to the vehicle inertial attitude or angular velocity.

5. A method as recited in claim 1 wherein excluding the star is performed on-board the vehicle.

6. A method as recited in claim 1 wherein selecting comprises when a star is within the first exclusion zone, excluding the star,
   when the star is in a second exclusion zone of the multiple exclusion zones, excluding the star when the brightness is below a first magnitude.

7. A method as recited in claim 6 wherein the first exclusion zone has a different shape than the second exclusion zone.

8. A method as recited in claim 6 further comprising when the star is in a third exclusion zone of the multiple exclusion zones, excluding the star when the brightness is below a second magnitude, different than the first magnitude.

9. A method as recited in claim 8 wherein the third exclusion zone has a different shape than the first exclusion zone or the second exclusion zone.

10. A method of determining a vehicle inertial attitude or angular velocity, comprising:
    in a ground station, calculating multiple stayout zones including both circular and non-circular stayout zones, calculating at least one circular and one non-circular stayout zone associated with at least one object;
    in said ground station, selecting at least one stayout zone from said multiple stayout zones;
    calculating at least one star inside said at least one stayout zone intruded by said at least one object therein;
    listing said at least one star inside said at least one stayout zone in an exclusion list;
    flagging star catalog or database entries, corresponding to said at least one star listed on said exclusion list, as excluded from consideration by an attitude determination algorithm and procedure or a angular velocity determination algorithm and procedure; and
    determining a vehicle inertial attitude or angular velocity, in response to data including star position measurements and said star catalog,
    wherein excluding said at least one star is dependent on the brightness of the star and of the object, said brightness having a first and second magnitude, said second magnitude being different from the first magnitude.

11. A method as recited in claim 10 wherein excluding the star is performed for a fixed period of time.

12. A method as recited in claim 10 wherein excluding the star is performed for a non-fixed period of time.

13. A method as recited in claim 10 further comprising controlling vehicle attitude or angular velocity, in response to the vehicle inertial attitude or angular velocity.

14. A method as recited in claim 10 wherein excluding the star is performed on-board the vehicle.

15. A method as recited in claim 10 wherein selecting comprises when a star is within the first exclusion zone, excluding the star,
when the star is in a second exclusion zone of the multiple exclusion zones, excluding the star when the brightness is below a first magnitude.

16. A method as recited in claim 15 wherein the first exclusion zone has a different shape than the second exclusion zone.

17. A method as recited in claim 15 further comprising when the star is in a third exclusion zone of the multiple exclusion zones, excluding the star when the brightness is below a second magnitude, different than the first magnitude.

18. A method as recited in claim 17 wherein the third exclusion zone has a different shape than the first exclusion zone or the second exclusion zone.

19. A system comprising:
a vehicle comprising,
an attitude control system or angular velocity control system;
a star tracker having field of view; and
a ground station comprising,
a star catalog memory having a star catalog stored therein said star catalog having a plurality of entries, each entry having an associated flag therewith;
an exclusion list memory; and
a processor coupled to said attitude or angular velocity control system and said star catalog, said exclusion list memory, said processor determining multiple stayout zones including both circular and non-circular stay out zones, calculating at least one circular and non-circular stay out zone for at least one object, selecting a stayout zone from said multiple stayout zones, determining a subset of said at least one object in said stayout zone, excluding at least one object from said subset of said at least one object from said field of view within said stayout zone to form a revised database, star catalog, or star sub-catalog, determining a vehicle inertial attitude, angular velocity, relative star sensor or tracker alignment estimate, in response to said revised database, star catalog, or star sub-catalog and controlling said attitude control system or angular velocity system in response to said revised database, star catalog, or star sub-catalog,
wherein excluding the star is dependent on the brightness of the star and of the object said brightness having a first and second magnitude, said second magnitude being different than the first magnitude.

20. A system as recited in claim 19 wherein the vehicle comprises a spacecraft.

21. A system as recited in claim 19 wherein said multiple stayout zones comprises calculating at least one circular stayout zone.

22. A system as recited in claim 19 wherein selecting comprises when a star is within the first exclusion zone, said processor excluding the star,
when the star is in a second exclusion zone of the multiple exclusion zones, said processor excluding the star when the brightness is below a first magnitude.

23. A system as recited in claim 22 wherein the first exclusion zone has a different shape than the second exclusion zone.

24. A system as recited in claim 22 further comprising when the star is in a third exclusion zone of the multiple exclusion zones, said processor excluding the star when the brightness is below a second magnitude, different than the first magnitude.

25. A system as recited in claim 23 wherein the third exclusion zone has a different shape than the first exclusion zone or the second exclusion zone.

* * * * *